Figure 1:
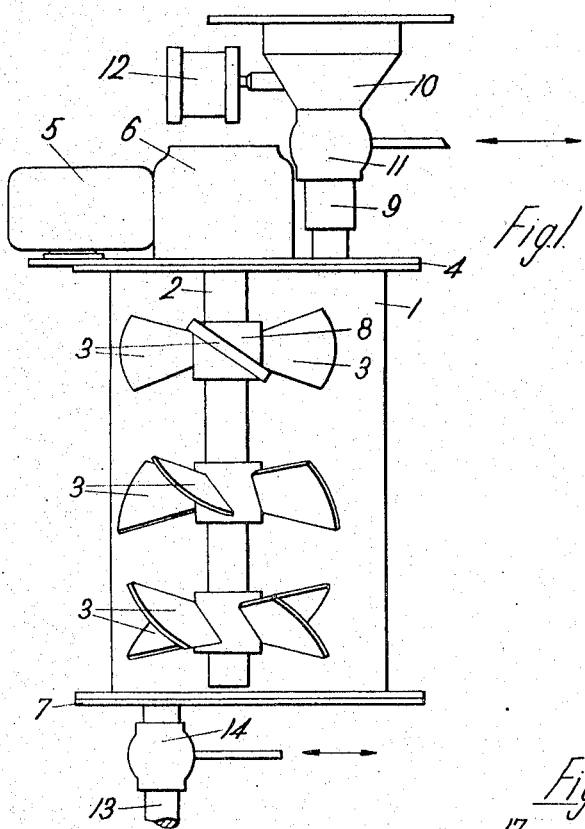

March 7, 1967  D. WILDE  3,307,834
METHODS FOR MIXING FINELY-DIVIDED MATERIALS
Filed March 3, 1964  2 Sheets-Sheet 1

Inventor
Dennis Wilde
By
Attorneys

March 7, 1967     D. WILDE     3,307,834
METHODS FOR MIXING FINELY-DIVIDED MATERIALS
Filed March 3, 1964     2 Sheets-Sheet 2
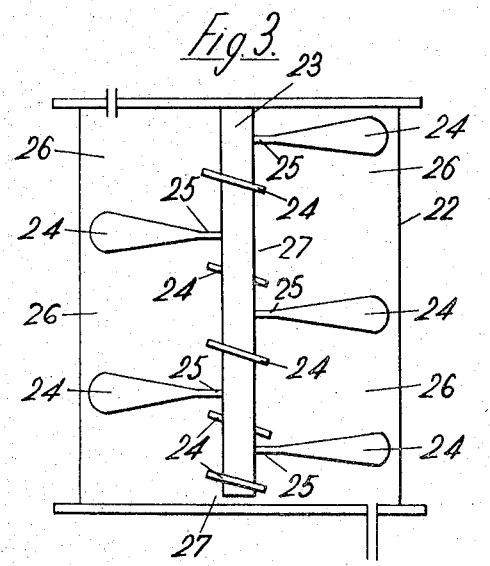
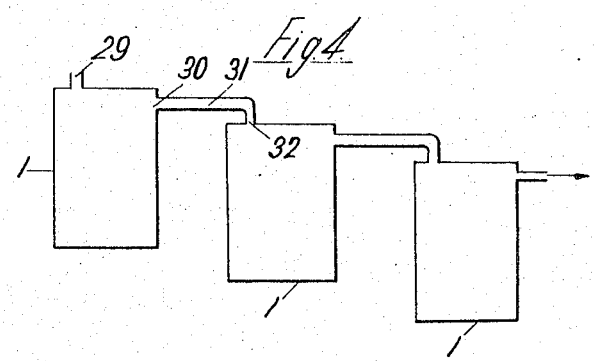
Inventor United States Patent Office 3,307,834
Patented Mar. 7, 1967

3,307,834
METHODS FOR MIXING FINELY-DIVIDED
MATERIALS
Dennis Wilde, Ormskirk, England, assignor to Pilkington Brothers Limited, Liverpool, Lancashire, England, a corporation of Great Britain
Filed Mar. 3, 1964, Ser. No. 349,121
Claims priority, application Great Britain, Mar. 5, 1963, 8,787/63
5 Claims. (Cl. 259—66)

This invention relates to methods for mixing finely divided materials, for example for mixing ingredients of a batch of glass-forming materials.

It is a main object of the present invention to provide a method for effectively mixing finely divided materials (for example of particle diameter of about 100 mesh sieve and smaller), and in particular, for mixing the particles of different size together throughly. Desirably, also, the mixing is effected in a comparatively short time for the volume of materials being mixed.

Accordingly the present invention provides a method of intimately mixing the components of a glass batch in a confined space wherein circulation is engendered in the batch in such a way that the particles of the batch are caused to flow with particles of the batch in the circumferential region of the confined space moving upwardly and particles of the batch in the central region of the confined spaced moving downwardly in said flow with exchange of material between upwardly and downwardly moving streams, and substantially shear forces existing at the boundaries of and within the circumferential region, a rapid blending of the components being effected by the exchange and the shearing action between the moving streams in the said flow pattern, while turbulence within the moving streams breaks down agglomerates of particles of individual components.

The flow of the patch particles is constituted by movement of the particles at high speed in the upwardly and downwardly flowing streams, and the shear forces are in large measure generated by impact of the particles in one stream on the particles in the oppositely moving stream.

The movement which the particles of the batch are caused to undertake is a flow movement similar to that which is present in a liquid when the liquid moves. It is believed that the flow pattern in which finel divided particles of the material are caused to move is achieved by maintaining the particles in a mobile state in which the particles are separated from one another by air and are capable of movement relative to each other. Thus the mixing is facilitated because a short range interchange of particles is enforced within the flow pattern, and from one direction of flow to another.

The method according to the invention has particular application in the mixing of batches of particles of materials in finely divided form, that is to say a particle diameter of about 200 mesh sieve and smaller. In some glass manufacturing techniques, the glass batch is selected from particles in such a particular finely divided form, in order to reduce the melting time of the batch. In such a case, the largest particles in the batch are frequently of particle diameter of 200 to 300 mesh sieve. However, some finely divided materials are difficult to mix by conventional mixing processes because of the tendency of these materials, particularly silica, to form agglomerates during storage and mixing. The action of conventional mixers is not adequate to break up these agglomerates, nor to produce a short range interchange of individual particles of different components of the batch.

If agglomerates of each component of the batch are not broken down in the mixing process and are not dispersed as individual particles, the advantages derived from the choice of very finely divided materials are lost.

After devoting considerable experimental research to varying methods of mixing finely divided materials together, the applicants herein have found that effective mixing is obtained and the difficulties caused by agglomeration are overcome when the method of the present invention is used and the flow pattern in the confined space is obtained by engendering circulation in the batch in such a way as to thrust particles of the batch in a generally downward direction in a central region of the confined space.

At the end of the downward travel of the particles in the central region of the confined space, the bath particles are caused to change direction as a result of induced air flow in the confined space.

According to this aspect of the present invention, therefore, there is provided a method of intimately mixing the components of a glass batch in a confined space wherein circulation is engenedered in the batch in such a way as to cause particles of the batch to flow in the confined space by thrusting particles of the batch in the central region of the confined space in a generally downward direction and, by mechanically induced air flow in the confined space, causing batch particles to change direction towards the end of their travel in the downward direction and to be thrust in a generally upward direction in the circumferential region of the confined space so that shearing of the batch occurs between the upwardly and downwardly moving streams with interchange of individual particles between the streams, and a rapid blending of the components is thereby effected.

It will be appreciated that a general rotation, that is a tangential motion in the horizontal plane is superimposed on the upward motion of material in the circumferential region by the rotary action of the blades, thus engendering a shearing action of the material between the blades and the outer walls of the container, and also engendering change of velocity and exchange of material between upwardly and downwardly moving streams as material moves from the narrower to the wider part of the circumferential annulus and back again. Agglomerates are broken down by impact against a blade and prevented from reforming by the relative movement of the supported particles in the circumferential region.

Advantageously the circulation of the particles of the glass batch is engendered by shearing through the batch at a plurality of levels with blades rotating about a shaft which is eccentrically mounted within the confined space. It will also be appreciated that the quantity of the finely divided material which is to be mixed in the confined space must be such that if the material were allowed to settle in the confined space, there would be a considerable headspace over the settled material prior to mixing taking place. It is possible to operate according to this aspect of the invention by starting rotation of blades mounted on an eccentrically disposed shaft in a finely divided material which is settled in the confined space, and expansion of the powder during mixing occurs, so that the powder effectively occupies the whole volume of the confined space. However, in normal operation, the blades on the eccentrically mounted shaft are already revolving as the powder of the finely divided materials is introduced.

The present invention therefore comprehends apparatus for intimately mixing finely divided materials, for example the components of a glass batch, comprising a container for the finely divided materials and a rotary shaft eccentrically disposed in the container, sets of blades secured in spaced relation axially of the shaft to shear through the material, each blade having an angle of attack such that a downward thrust is imparted to the air and material in the central region, the effective radius of the blades being such that, to one side of the container axis, the blades have a slight clearance and diametrically opposite have a relatively large clearance and rotation of the shaft, causing a movement of the materials in a generally downward direction in a central region of the container, which central region includes said rotary shaft, and movement of the materials in a generally upward direction in a circumferential region of the container.

Advantageously the finely divided materials to be mixed are introduced by pouring the materials into a circumferential region. The container is therefore normally provided with an inlet for the materials at an upper end of the container in said circumferential region. When apparatus of the type employing an eccentrically disposed shaft is used to mix separate batches of material, the outlet for the materials is conveniently in the base of the container in the central region. The downward thrust engendered by the rotation of the shaft and the blades produces a very rapid emptying of the container. Conveniently the rotary shaft is carried in a bearing on the upper end of the container and is of a length less than the internal height of the container.

Advantageously the blades are made of glass and all the interior surfaces of the container are glass-lined. If desired, successive sets of blades may be angularly staggered relative to one another about the shaft.

It is found that when powders including particles of diameter size greater than 200 mesh are used, there is a tendency for mixing to fail and for there to be a build-up of particles at the bottom of the confined space. However, mixing of batches including somewhat coarser particles can be achieved by causing the particles to move in a manner according to the method of the present invention by applying direct mechanical thrust to assist upward movement of the batch in the circumferential region. Batch particles impelled in the upward direction change direction towards the end of their travel and a general downward movement under gravity of batch particles in a central region of the confined space is obtained.

According to this aspect of the present invention, therefore, there is provided a method of intimately mixing the components of a glass batch in a confined space wherein circulation is engendered in the batch in such a way as to cause particles of the batch to flow in the confined space by thrusting particles of the batch in a circumferential region of the confined space in a generally upward direction and allowing batch particles impelled in the said upward direction to change direction towards the end of their travel in the said upward direction and to move in a generally downward direction in a central region of the confined space, with exchange of material between upwardly and downwardly moving streams, and substantial shear forces existing at the boundaries of and within the circumferential region, a rapid blending of the components being effected by the exchange and the shearing action between the moving streams in the said flow pattern, while turbulence within the moving streams breaks down agglomerates of particles of individual components.

Advantageously the circulation of the particles of the glass batch according to this aspect of the invention is engendered by rotary movement of spirally mounted blades on a single shaft.

The invention therefore also comprehends apparatus for intimately mixing finely divided materials, for example the components of a glass batch, comprising a container for the finely divided materials and a rotary shaft concentrically disposed in the container, a plurality of blades spirally disposed about said rotary shaft, each blade having an angle of attack such that the blades may impart to the finely divided materials a movement in an upward direction in a circumferential region of the said container, and will allow a general downward movement of the materials in a central region of the container.

Shearing of the batch is produced by relative movement between the blades and walls of the container and at the boundary between the upwardly and downwardly moving streams. Short range interchange of particles occurs in the upwardly moving stream of mobile particles and is facilitated by a direct action of the moving blades. Agglomerates are broken up by the action of the roots or stalks of the blades on the descending stream.

Advantageously the blades of the said rotary shaft are positioned vertically nearer to one another at the lower end of the shaft than at the upper end of the shaft.

Conveniently the shaft has from 9 to 11 blades, and preferably 10 blades are used. Desirably the blades substantially fill the confined space within the apparatus and allow the minimum practical clearance.

In order to facilitate the falling of the particles down the central region of the mixer during operation, the blades may be mounted on short stalks. These stalks on which the blades are mounted will cause agitation in the falling powder during operation and will therefore assist mixing.

The method according to the present invention may be adapted for continuous operation, in which case the materials to be mixed are continuously introduced in to the circumferential region of a mixer and materials continuously removed from the mixer through an outlet in the side of the mixer near the top and diametrically opposite the inlet position. All particles would make at least one circuit of the mixer and, in order to ensure intimate mixing, a number of mixers are arranged in series.

According to this aspect, therefore, the present invention provides a method of intimately mixing the components of a glass batch comprising continuously introducing the said components of the glass batch into a circumferential region of a confined space, engendering circulation of the materials comprising the batch in the said confined space in such a manner that the particles introduced therein are caused to flow in a generally downward direction in the central region of the confined space and are caused to change direction towards the ends of their travel in the said downward direction so that batch particles flow in a generally upward direction in the circumferential region of the confined space, with exchange of material between upwardly and downwardly moving streams, and substantial shear forces existing at the boundaries of and within the circumferential region, a rapid blending of the components being effected by the exchange and the shearing action between the moving streams in the said flow pattern, while turbulence within the moving streams breaks down agglomerates of particles of individual components, continuously removing from a portion of said circumferential region of the confined space particles of the glass materials which have been partially mixed in the confined space, and continuously introducing the partially mixed materials obtained from the circumferential region of the said confined space into a circumferential region of a further confined space, where the particles of the glass batch are subjected to a similar treatment, whereby an intimately mixed glass batch is continuously obtained from said further confined space.

Figure 2:
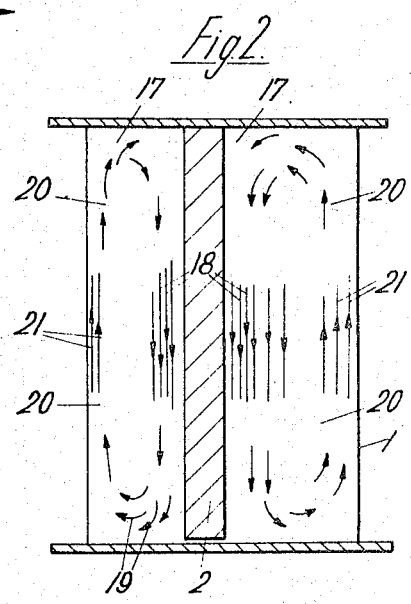

In order that the invention may be more clearly understood, two embodiments thereof will now be described by way of example, with reference to the accompanying diagrammatic drawings, in which:

FIGURE 1 shows one embodiment of apparatus according to the invention,

FIGURE 2 indicates schematically the general flow pattern of the materials in the apparatus during the operation, FIGURE 3 shows another embodiment of the present invention, and FIGURE 4 shows schematically an arrangement for continuous mixing according to the invention.

In the drawings like reference numerals designate the same parts.

In the drawings and referring particularly to FIGURE 1, there is shown an upright cylindrical container 1 in which there is eccentrically disposed a vertical rotary shaft 2 having secured thereto three sets of four similar blades 3. The container 1 is bolted at its upper end to a base plate 4 which carries a variable speed belt drive motor 5 and a worm gear housed in the box 6. A bearing (not shown) is provided in the box 6 for the vertical rotary shaft 2, and the shaft 2 passes through the base plate 4 via a labyrinth dust seal. The lower end of the container 1 is sealed by a bottom cylinder plate 7, and the length of the vertical rotary shaft 2 is less than the internal height of the container 1, so that no bottom bearing is used.

The vertical rotary shaft 2 carries the three sets of blades 3, each blade being mounted in this embodiment at an angle of from 15° to 25° to the horizontal in angle jaws 8. At this angle to the horizontal the blades 3 are able to shear through the finely divided materials, to break up agglomerates and to apply a downward force to the materials.

Above the container 1 there is an inlet 9 which allows finely divided material to pass from a bin 10 through an inlet valve 11 into a cylindrical container 1. A vibrator 12 is associated with the bin 10. The bin 10 is removable and is placed in position with the appropriate materials already therein. At the lower end of the container 1 there is an outlet 13 and a discharge valve 14 which controls the discharge of the material from the container 1.

The eccentric mounting of the vertical shaft 4 is such that the blades 3 have only a slight clearance on the left hand side of the cylindrical container 1 as seen in FIG-URE 1 and have a relatively large clearance on the diametrically opposite side of the container 1, that is to say, the right hand side of the container as seen in FIG-URE 1.

The inlet 9 for the finely divided materials is located near the side of the container where there is a relatively large clearance, and the outlet 13 at the bottom of the container 1 is at the side of the container where there is a slight clearance between the blades and the container wall.

In operation the vertical rotary shaft 2 is rotated so that the blades 3 move from right to left as seen in FIG-URE 1 and the finely divided material in the central region of the confined space within the container is forced in a generally downward direction.

The rotation of the blades 3 induces in the confined space an air flow which causes batch particles to change direction near the bottom cylinder plate 7 and to be swept outwardly and then upwardly in a circumferential region of the confined space. This upward movement of batch particles in the circumferential region of the container is facilitated by the presence of a relatively large clearance between the tips of the blades 3 and the wall of the container on the righthand side of the container as seen in FIGURE 1. However, the upward movement of batch particles occurs throughout the circumferential region.

Referring now to FIGURE 2, there is shown diagrammatically the flow pattern which is engendered in the particles of the batch in the container 1 along a line which is a diameter taken through the container as shown in FIGURE 1. On either side of the rotary shaft 2, the finely divided particles of the batch move in a flow pattern in which the particles in a central region 17 of the container 1 move downwardly as indicated by the arrows 18. As the batch particles being moved downwardly by the action of the blades 3 (not shown in FIGURE 2) approach the end of their travel in the downward direction, they are caused to change direction by the induced air flow in the confined space as indicated by the arrows 19 and batch particles are caused to be thrust in a general upward direction in a circumferential region 20 of the container 1 as indicated by arrows 21.

In any plane passing through the rotary shaft 2 and along the diameter of the container the motions in the left and right hand parts of the container 1 will be similar, although the length of travel of any particle completing a circuit along an outermost path of the right hand part to the container will be longer than the path of travel of a particle which completes a circuit along an outermost part of the left hand part of the container.

For use in mixing a batch of glass-forming materials the cylindrical container 1, the base plate 4 and the bottom cylinder cap plate 7 all have interior surfaces of linings of glass to avoid contamination of the glass batch being mixed in the cylindrical container 1. For example the cylindrical container 1 may be made of glass, and the base plate 4 and the bottom cylinder plate 7 of metal, for example steel, with a glass lining.

The vertical rotary shaft 2 is mounted so that its axis is eccentric to the axis of the cylindrical container. The angle jaws 8 on the shaft 2 are faced with rubber and the blades 3 are quadrants of a circular glass plate. Successive sets of blades 3 are staggered relative to each other so that it is not possible for a particle of material to fall from the top of the container 1 through the sets of blades 3 without striking at least one of the blades 3.

In operation a charge of batch ingredients to be mixed in a finely divided form is charged into the bin 10 and the inlet valve 11 is opened to admit the materials into the container 1 through the inlet 9. The vibrator 12 is used to facilitate the passage of the finely divided materials from the bin 10 into the container 1. The weight of the batch depends on the bulk density of the batch ingredients and the expansion which the charge undergoes due to the aeration caused by the rapid rotation of the blades 3. A considerable degree of expansion of the batch particles is allowed to occur, for example about 30% of the settled volume of the batch particles, depending on particle size and density.

Advantageously the rotation of the shaft 2 and the blades 3 mounted thereon is already occurring when the batch ingredients are introduced and a mobile state of the materials within the container 1 is immediately created.

The rotation of the shaft 2 is such that the blades 3 move from right to left, as seen in FIGURE 1, and force the finely divided materials downwards in the central region of the container 1 and the mechanically induced air flow causes a change in the direction of travel of the particles, as they near the end of their downward travel, as already described, particularly with reference to FIG-URE 2. At the same time, however, the blades 3 are superimposing upon the general flow pattern, indicated in FIGURE 2, a rotation of the whole batch in the container with a consequent shearing action. There is a considerable amount of short range interchange of particles within the flow pattern of FIGURE 2.

In the operation of the mixer according to the present invention, the air flow which is induced in the container is in an opposed direction to the compacting action of gravity. It is found with this arrangement that a thorough and effective mixing of the batch particles may be obtained in a very short time, for example half a ton of material may be mixed within 2 or 3 minutes.

When the mixing is being accomplished on a batch principle, as just described, when the mixing process is completed, the valve 14 is opened, and the mixed materials are discharged from the container 1.

The blades 3 on the rotary shaft 2 are rotated at a speed in a range from about 250 to about 500 revolutions per minute depending on the size of the mixer. The actual choice of speed of rotation of the blades 3 depends on the average size of the particles being mixed.

In FIGURE 3, there is shown another embodiment of apparatus for carrying out the method of intimately mixing the components of a glass batch according to the present invention. In FIGURE 3 there is shown a container 22 having a rotary shaft 23 concentrically mounted therein. The shaft 23 has ten blades 24 mounted thereon in the form of a spiral having a greater distance vertically between the position of successive blades at the upper end of the shaft 23 than is present between the blades 24 at the lower end of the shaft 23. The blades 24 are each mounted on the rotary shaft 23 by means of a short stalk 25. Each of the blades 24 on the rotary shaft 23 substantially fills the available distance between the shaft 23 and the wall of the container 22, only the minimum practical clearance between the tip of the blades 24 and the vertical wall of the container 22 is left.

The loading of the container 22 is carried out in a manner similar to that already described for the container 1 of FIGURE 1, except that the particles of the batch introduced into the container have a greater average particle size, for example the particles have an average particle size between 50 and 150 mesh sieve. The rotary shaft 23, however, is rotated so that the blades move from left to right, as shown in FIGURE 3, the speed of rotation being about 150 revolutions per minute, depending on the size of the mixer.

The blades 24 therefore impart to the batch particles a movement in a general upward direction in a circumferential region 26 of the container 22. As the batch particles impelled upwardly near the end of their travel in this upward direction, they are caused to change direction and batch particles move in a general downward direction in a central region 27 within the confined space of the container 22. There is thus imposed on the particles in the container 22 a general flow pattern similar to that shown in FIGURE 2 except that, in the case of the container 22, the left and right hand parts of the flow pattern along a diameter through the path 22 will be equal in size. A considerable proportion of the batch particles move downwardly in the part of the central region 27 in which the stalks 25, carrying the blades 24 rotate. The rotation of the stalks 25 and the blades 24 causes a general rotation of the particles within the container 22, which rotation is superimposed on the flow pattern similar to FIGURE 2. In particular the continual rotation of the stalks 25 in the central region 27 of the container 22 agitates considerably the falling particles in this central region and an intimate mixing of the batch particles in the container 22 is effected.

Instead of intimately mixing particles on the batch system, a continuous mixing of the ingredients from which a glass will be formed can be made. FIGURE 4 indicates diagrammatically apparatus for this purpose. In FIGURE 4 there are shown three containers 1 arranged in series, and the ingredients of the glass in finely divided form are introduced into a circumferential region of the first of these containers 1 through the inlet 29. The containers 1 are all similar to the container of FIGURE 1 and operate on the same principle, the ingredients of the glass-forming materials being introduced as particles having an average size of the order of 300 mesh sieve.

The outlet 30 positioned near the upper end of the container 1 is arranged so that particles which are moving in an upward direction in the container may overflow into the outlet 30, from which they are passed along a passage 31 and introduced into an inlet 32 into the second container 1 in the series.

Three containers 1 are arranged in series, because, on the average, particles introduced into any individual container will make only a few circuits of that container, but by providing three containers 1, all effecting mixing in series, an intimate mixing of the ingredients of the glass may be achieved.

When it is desired to use a continuous mixing process for larger-sized particles, a series of containers 22 should be used joined together in a similar manner to the containers 1 shown in FIGURE 4.

It has been found using the method and apparatus according to the present invention for mixing finely divided components of a glass batch, for example, that the components are sufficiently mixed, and silica agglomerations are thoroughly broken up.

The apparatus according to the present invention has the particular advantage that it may be very easily and quickly cleaned, as the apparatus is essentially simple in construction.

Furthermore, the method and apparatus according to the present invention have another advantage in that mixing of the particles of finely divided materials may be achieved without introducing air through any of the walls or ends of the containers during the mixing processes. Naturally, however, if it is desired to reduce the loading on either of the mixers previously described, the lower end of the container may be formed from porous materials and means be provided for introducing air into the container through the porous lower end.

I claim:
1. A method of intimately mixing the components of a glass batch, which components are in a dry particulate form, the mixing being performed in a confined substantially cylindrical space, which is disposed with the axis of the cylinder defining said confined space substantially vertical, by causing all the particles which are to be mixed to circulate within the confined space in a flow in which those particles of the batch which are at any time in the circumferential region of the confined space move upwardly therein and those particles of the batch which are at any time in the central region of the confined space move downwardly therein, the movement in the said flow together with a general rotation of all particles in the said confined space being caused by rotation of a plurality of similar blades mounted on a common shaft having its axis parallel to the axis of the said cylinder defining the confined space, the said plurality of similar blades being in spaced relation in the direction of the axis of the common shaft, whereby the blades shear through the particles comprising the batch at a plurality of levels and act over substantially the whole height of the confined substantially cylindrical space to thrust in one direction over substantially the whole height of the confined space in a region selected from the said circumferential region and the said central region of the confined space, so that rapid movement in both said upwardly and downwardly moving streams takes place and shear forces exist at the boundaries between said central and circumferential regions and a rapid blending of the components of the batch is effected by the exchange and the shearing action between the moving streams in the said flow pattern, while turbulence within the moving streams breaks down agglomerates of particles of individual components.

2. A method according to claim 1 in which the circulation of the particles of the glass batch is engendered by rotary movement of spirally-mounted blades on a single shaft.

3. A method according to claim 1, wherein the blades act in spaced relation in the direction of the axis of the common shaft and over substantially the whole height of the confined substantially cylindrical space to thrust particles of the batch in the central region of the confined space in a generally downward direction and to induce in the confined space an air flow which will cause batch particles moving downwardly in the central region to change direction towards the end of their travel in the downward direction and to be thrust in a generally upward direction in the circumferential region of the confined space.

4. A method according to claim 1, wherein the blades act at spaced intervals over substantially the whole height of the confined substantially cylindrical space to thrust particles of the batch in the circumferential region of the confined space in a generally upward direction and allow batch particles impelled in the said upward direction to change towards the end of their travel in the said upward direction and to move in a generally downward direction in a central region of the confined space, the blades being mounted on stalks which act in the central region of the container to agitate particles moving downwardly in the central region and to facilitate the intimate mixing of the batch particles.

5. A method according to claim 1, wherein particles of the glass batch which have been partially mixed in the confined substantially cylindrical space are removed from a portion of said circumferential region of the confined space and partially mixed material so removed is continuously introduced into the circumferential region of a further confined substantially cylindrical space, where the particles of the glass batch are subjected to a similar treatment, whereby an intimately mixed glass batch is continuously obtained from said further confined substantially cylindrical space.

References Cited by the Examiner
UNITED STATES PATENTS

| | | | |
|---|---|---|---|
| 347,020 | 8/1886 | Wise | 259—122 |
| 692,774 | 2/1902 | Appleby | 259—7 |
| 2,301,461 | 11/1942 | Schnetz | 259—7 |
| 2,958,517 | 11/1960 | Harker et al. | 259—8 X |
| 3,001,486 | 9/1961 | Duncan et al. | 259—9 X |
| 3,202,281 | 8/1965 | Weston | 259—8 X |

FOREIGN PATENTS

| | | |
|---|---|---|
| 1,177,416 | 12/1958 | France. |
| 1,027,966 | 4/1958 | Germany. |

WALTER A. SCHEEL, *Primary Examiner.*

IRVING BUNEVICH, *Examiner.*

J. M. BELL, *Assistant Examiner.*